3,425,922
ISOMERIZATION OF DIFLUORAMINOOLEFINS WITH IONIZING RADIATION

Donald A. Guthrie, Cranford, N.J., assignor to Esso Research and Engineering Company, a corporation of Delaware
No Drawing. Filed Aug. 3, 1960, Ser. No. 47,321
U.S. Cl. 204—158
Int. Cl. B01j *1/10*
4 Claims The present invention relates to the isomerization of difluoroamino compounds and more particularly to migration isomerization of difluoroamino groups in unsaturated compounds accompanied by a shifting of the unsaturated bond.

Olefins possessing one or more difluoroamino groups can be reacted with tetrafluorohydrazine to add more $NF_2$ groups to the unsaturated bond or bonds and thus produce high energy oxidizers useful in rocket propellants. It has been noted that the addition reaction proceeds more easily when the unsaturation is in a terminal or alpha position. Frequently the main components of a mixture of aliphatic organic difluoroamine compounds possess internal unsaturated bonds which are less reactive in the addition reaction. One object of this invention is to provide a method of isomerizing mixtures of unsaturated difluoroamine compounds to make the more reactive isomers. Other objects of the invention will be apparent from the following description of the process.

In accordance with the present invention, unsaturated difluoroamino compounds are isomerized by subjecting them to thermal or radiant energy for a relatively short period of time whereby the unsaturated bond and one or more of the $NF_2$ groups attached to the atoms in the carbon chain shift or migrate. This discovery was surprising since it was believed that the difluoroamino compound would either decompose or that no migration would take place until very high temperatures, e.g. above 300° C., were employed. It was found that isomerization occurs at room temperature or lower when ionizing radiation is used.

This finding affords an opportunity to improve the method of preparing difluoroamino compounds from multiolefins, such as butadiene-1,3. In the first step of the process, two or more $NF_2$ groups are added to the multiolefin to produce a mixture containing a substantial amount of unsaturated difluoroamino compounds that have an internal double bond. As mentioned above, these compounds are less reactive and therefore difficult to saturate with difluoroamine groups. This situation is alleviated by isomerizing the internally unsaturated $NF_2$ compounds in accordance with the present process and thereafter separating the isomerized material from the feed and recycling the unreacted feed to the isomerization zone. Meanwhile the isomerizate is reacted with additional tetrafluorohydrazine to make a product having a high $NF_2$ to carbon ratio, preferably at least 1:1. In lieu of the foregoing, the isomerizate can be reacted with dinitrogen textroxide to make a difluoroamino product containing one or more nitro groups.

The isomerization reaction can be carried out over a wide temperature range. Elevated temperatures may, or may not, be used to promote the reaction where high energy ionizing radiation is employed. Broadly speaking, the isomerization may be effected at temperatures ranging from as low as −70° C. to as high as 150° C., with temperatures of about 0 to room temperature being favored for reactions carried out in the presence of a radiation source. Lower reaction temperatures have the added advantage of promoting the formation of larger amounts of isomerizate having a terminal double bond, especially in the case of bis-(difluoroamino) butenes. Where only thermal energy is used to effect the isomerization, temperatures in the range of about 100 to 150° C. should be employed.

Regardless of the type of energy used to promote the isomerization, that is, whether it be thermal or radiant, the total amount of energy used for a reaction will be in the range of about 2 to 110 calories per gram of olefin feed. This corresponds to approximately 1 to 50 mr. of ionizing radiation.

The reaction time may vary from less than an hour to a day or more depending upon the severity of the conditions employed. Usually equilibrium is attained within about .1 to 24 hours and therefore reaction periods of this length are generally quite satisfactory, particularly where ionizing radiation is utilized.

If desired, an inert hydrocarbon diluent, such as n-hexane, benzene or xylene, as well as various chlorinated solvents, such as chloroform, dichloromethane, dichloroethane or chlorobenzene, may be employed to reduce the viscosity of the olefin feed. Frequently it is not necessary to use a diluent since most of the reactants are relatively low viscosity liquids which may be used as such. Likewise the type of reactor is not critical, however, it is advisable to use a stainless steel vessel or bomb where superatmospheric pressures may result. Glass vessels are suitable for the low temperature reactions, for example when the reactants are exposed to ionizing radiation. However, the isomerization should be carried out in an inert atmosphere, such as the olefin itself, nitrogen, helium or carbon dioxide.

In the isomerization reaction, a part of the internally unsaturated feed undergoes a change whereby one or more of the $NF_2$ groups migrate or move from one carbon atom to another while concurrently the double bond in the molecule also shifts so that it is no longer in its original position. For instance, if a monoolefin such as 1,4-bis-(difluoroamino) butene-2 is subjected to a sufficient amount of ionizing or thermal energy, a portion of it will be converted into 1,2-bis-(difluoroamino) butene-3. It will be noted that in the foregoing example one of the difluoroamine groups shifted from a terminal carbon atom to the carbon atom adjacent to the carbon atom attached to the other difluoroamine group and the double bond shifted into the terminal position. The isomerizate withdrawn from the reaction zone may then be separated and the isomers having terminal double bonds can be further reacted with tetrafluorohydrazine to produce a saturated compound. If the isomers vary substantially in their boiling point, this separation can be easily accomplished by means of an efficient distillation. In the case of the $C_4$ bis-difluoroamino compounds, the isomer having the terminal double bond boils at a temperature which is about 30° below the boiling point of the isomers having internal unsaturation. Thus, it can be taken off overhead from the reaction mixture by simple distillation and the bottoms can be recycled to the reactor to undergo further isomerization.

The isomerization feed is generally obtained by reacting one mole of a multiolefin, such as butadiene-1,3 with an excess, e.g. about 2 to 4 moles, of tetrafluorohydrazine. Superatmospheric pressures and elevated temperatures may be used to increase the rate of reaction. For instance, the aforementioned hydrocarbon diolefin may be converted to a mixture of Bis-(difluoroamino) butenes by reacting it in a stainless steel bomb with an excess of tetrafluorohydrazine at pressures of 2 to 300 p.s.i. and temperatures of 100 to 120° C. for 2 or 3 hours. Longer periods of time, e.g. 4 or 5 days, are necessary at ambient temperatures. The liquid "bis" products are thereafter isomerized in the vapor, liquid or vapor-liquid phase, depending upon the conditions, in accordance with the above-described process.

As mentioned above, the isomerization reaction can be effected by exposing the difluoramino olefin feed to high energy ionizing radiation, that is to say, high energy quanta (radiation wave length of less than 50 A.) neutrons and charged and uncharged particles of atomic and sub-atomic nature having energies greater than about 30 electron volts. Types of radiation suitable for the purposes of the invention include high energy electromagnetic radiation such as gamma rays and X-rays and high velocity electrons, as well as beta rays and alpha particles. These types of radiation can be supplied by naturally-occurring radioactive materials which emit alpha, beta and gamma rays or by electrical devices which accelerate charged particles.

Fission by-products of processes generating atomic power, or fissionable materials which emit high energy gamma rays also afford a highly desirable and most abundant source of radioactivity suitable for the purposes of the invention. These by-products include those with atomic numbers ranging from 30 to 63 and their compounds. They are formed in the course of converting uranium and thorium and other fissionable materials in an atomic reactor. By high energy ionizing radiation is meant radiation from terrestrial sources of sufficient intensity such that the dose rate is at least $1 \times 10^{-4}$ kwh./hr./lb. of reactant. This excludes radiation such as cosmic and ultraviolet which are ineffectual for the purposes of this invention.

Materials made radioactive by exposure to neutron irradiation, such as radioactive cobalt-60, which emits gamma rays, can likewise be used. Suitable sources of high velocity electrons are the beams of electron accelerators, such as the Van de Graaff Electrostatic Accelerator. In general, however, high velocity electrons and high energy gamma radiation and its well-known sources such as nuclear fission by-products and materials made radioactive by neutron irradiation, are preferred for the purposes of the invention mainly because of the relatively high penetrating power of the rays and the availability and ease of application of these sources of radiation.

The isomerizate obtained in accordance with the present invention is useful per se as an oxidizer for rocket propellants. However, when the olefin intermediates are saturated with $NF_2$ groups they become even more effective as oxidizers and can be employed in high energy rocket propellants. They may be blended or mixed with solid fuels, such as powdered boron or aluminum, and hydrocarbons such as natural or synthetic rubbers of various molecular weights, and in some cases with other oxidizers, such as tetranitromethane and ammonium perchlorate. A suitable solid propellant recipe in which 1,2-bis-(difluoramino) butene-3 and 1,2,3,4-tetrakis-(difluoramino) butane are used is as follows:

Composition: Weight percent 1,2-bis-(difluoramino) butene-3 _____ 15.00
    1,2,3,4-tetrakis-(difluoramino) butane _____ 31.79
    $[C_4H_6(NF_2)_2]_x$ [1] _____ 15.00
    Hexanitroethane _____ 37.33
    Boron _____ 0.88

[1] A binder consisting of fully difluoraminated cis-1,4-polybutadiene.

The products may also be used as detonators and explosives because they possess high energy characteristics. They may also be employed to prepare nitriles and other organic compounds by well known chemical techniques.

The following examples are submitted in order to provide a better understanding of the invention and the advantages derived therefrom:

Example 1

A mixture of "butadiene adducts" was prepared by reacting 1 mole of butadiene-1,3 with 1.0 mole of tetrafluorohydrazine at 23° C. and about 500 mm. of Hg pressure for 110 hours. The low boiling end was distilled in vacuo to leave a residue rich in the high boiling 1,4 isomers. The residual adduct mixture was introduced into a 15 cc. glass reaction vessel and the vessel and its contents were cooled with liquid nitrogen and thereafter the atmosphere in the reaction zone was evacuated by means of suction. The butadiene adduct was then brought to room temperature and exposed to a cobalt-60 source for 20.7 hours at a dose rate of $2.08 \times 10^6$ roentgens per hour per gram of reactant. The results of this run are set forth in the following table:

ISOMERIZATION OF DIFLUORAMINO BUTENES

| Compounds | Composition of initial mixture, wt. percent | Composition after 43.0 mr. irradiation, wt. percent |
|---|---|---|
| 1,2-bis-(difluoramino) butene-3 | 2.0 | 30.6 |
| 1,4-bis-(difluoramino) butene-2 (lower boiling isomer) [1] | 17.1 | 15.4 |
| 1,4-bis-(difluoramino) butene-2 (higher boiling isomer) [1] | 80.9 | 54.0 |

[1] The gas chromatographic retention times for these adducts in relationship to benzene in a silicone coated firebrick column are 1.83 for the low boiling isomer and 2.13 for the high boiling isomer. The "1,2-bis" adduct has a relative retention time of 0.88.

The foregoing data show that it is practical to isomerize unsaturated difluoramine compounds via radiation initiation to produce the more reactive isomers having a terminal double bond. The unisomerized "1,4-bis" adducts can be separated from the more reactive isomer by distilling the latter from the reaction mixture, e.g. recovering the liquid boiling at 47° C. under 108 mm. pressure, and reacted with an excess of $N_2F_4$ at 100 to 120° C. and 100 to 200 p.s.i.g. to make 1,2,3,4-tetrakis-(difluoramino) butane. The residual liquid in the distillation flask can be again subjected to the isomerizing conditions.

It is interesting to note that the isomer equilibrium at 25° C. appears to be approximately 70 wt. percent of the "1,4-bis" isomers and 30 wt. percent of the more reactive isomer. This is unusual since the equilibrium mixtures of analogous substances generally contain much less of the terminal olefin compound.

EXAMPLE 2

1,4-bis-(difluoramino) pentene-2 is isomerized in accordance with the foregoing example to 3,4-bis-(difluoramino) pentene-1.

EXAMPLE 3

1,4,5,6-tetrakis-(difluoramino) hexene-2 is isomerized in accordance with Example 1 to 3,4,5,6-tetrakis-(difluoramino) hexene-1.

EXAMPLE 4

Similarly a mixture of the type described in the table in Example 1 may be isomerized by heating the mixture to about 150° C. for 0.1 to 2 hours under a pressure equal to the sum of the partial pressures of the reactants. The "1,2-bis" adduct in the isomerization reaction mixture is again separated from the other isomers by distillation.

It is not intended to restrict the present invention to the foregoing examples which are merely given to demonstrate some of the embodiments of the invention. For instance, any lower molecular weight acyclic monoolefin, e.g., having 4 to 6 carbon atoms, possessing an internal double bond, or mixture containing such a monoolefin, can be used as a feed in this process.

What is claimed is:

1. A process for isomerizing a $C_4$ to $C_6$ acyclic bis-(difluoramino) monoolefin having an internal double bond, which comprises subjecting said monolefin to high energy ionizing radiation of 1 to 50 mr. at about room temperature which makes a difluoramino group in said monoolefin migrate from one carbon atom to another and makes the double bond shift to a terminal position, and recovering the resulting product having an increased concentration of the resulting isomer with a terminal double bond.

2. A process for isomerizing, 1,4-bis-(difluoramino) butene-2 by subjecting said bis-(difluoramino) butene to ionizing radiation of 1 to 50 mr. at about room temperature to shift the internal double bond of said bis-(difluoramino) butene-2 to a terminal position and make one of the difluoramino groups migrate from one carbon atom to another so as to form 1,2-bis-(difluoramino) butene-3 and recovering the 1,2-bis-(difluoramino) butene-3 isomer thus formed.

3. A process for isomerizing 1,4-bis-(difluoramino) butene-2 isomers in a mixture with 1,2-bis-(difluoramino) butene-3, which comprises exposing said mixture to about 1 to 50 mr. of ionizing radiation at approximately room temperature and atmospheric pressure to isomerize 1,4-bis-(difluoramino) butene-2 isomers in the mixture to 1,2-bis-(difluoramino) butene-3, and recovering the resulting mixture of increased 1,2-bis-(difluoramino) butene-3 isomerization product.

4. A process for isomerizing 1,4-(difluoramino) butene-2 isomers which comprises exposing said isomers to gamma rays from radioactive cobalt-60 at a dose rate of about two million roentgens per hour per gram of said isomers for a period of about 20 hours to form a mixture of isomers containing about 30 wt. percent of 1,2-bis-(difluoramino) butene-3 formed through irradiation of the 1,4-bis-(difluoramino) butene-2 isomers, and recovering the resulting mixture of the isomers with a thus increased concentration of 1,2-bis-(difluoramino) butene-3.

References Cited

UNITED STATES PATENTS

| | | | |
|---|---|---|---|
| 2,657,239 | 10/1953 | Rigby | 260—583 |
| 2,808,438 | 10/1957 | Mizzoni et al. | 260—583 |
| 2,936,272 | 5/1960 | Bender et al. | 204—154 |
| 2,952,719 | 9/1960 | Appell | 260—683.2 |
| 2,960,551 | 11/1960 | Feller | 260—683.2 |
| 2,978,392 | 4/1961 | Hollyday et al. | 204—154 |

LELAND A. SEBASTIAN, *Primary Examiner.*

U.S. Cl. X.R.

149—19, 22, 89, 109; 260—583